(12) United States Patent
Ratcliffe

(10) Patent No.: US 8,591,234 B1
(45) Date of Patent: Nov. 26, 2013

(54) KITS AND METHODS FOR EXPLORING MATHEMATICAL CONCEPTS

(76) Inventor: Bruce Allen Ratcliffe, Fresno, CA (US)

( * ) Notice: Subject to any disclaimer, the term of this patent is extended or adjusted under 35 U.S.C. 154(b) by 958 days.

(21) Appl. No.: 12/683,267

(22) Filed: Jan. 6, 2010

(51) Int. Cl.
*G09B 1/00* (2006.01)

(52) U.S. Cl.
USPC .......................................................... 434/149

(58) Field of Classification Search
None
See application file for complete search history.

(56) References Cited

U.S. PATENT DOCUMENTS

| | | | | |
|---|---|---|---|---|
| 2,844,890 A | * | 7/1958 | Oliver et al. | 434/203 |
| 2,929,159 A | * | 3/1960 | Feldhake | 434/211 |
| 4,382,794 A | | 5/1983 | Preus | |
| 4,548,585 A | * | 10/1985 | Kelly | 434/195 |
| 4,731,022 A | | 3/1988 | Garland | |
| 4,871,314 A | * | 10/1989 | Shih | 434/194 |
| 5,039,603 A | * | 8/1991 | Pocius | 434/188 |
| 5,098,301 A | * | 3/1992 | Woods | 434/195 |
| 5,390,452 A | * | 2/1995 | Eckert | 52/71 |
| 5,567,159 A | * | 10/1996 | Tehan | 434/178 |
| 5,871,361 A | * | 2/1999 | Gastle et al. | 434/295 |
| 5,876,212 A | * | 3/1999 | Hartung | 434/207 |
| 6,739,875 B1 | * | 5/2004 | Lin | 434/195 |
| 7,014,468 B1 | * | 3/2006 | Thorpe | 434/188 |
| 7,104,799 B1 | * | 9/2006 | Sansing | 434/195 |
| 7,354,272 B1 | * | 4/2008 | Zev | 434/188 |
| 7,364,431 B2 | * | 4/2008 | Schwartz | 434/209 |
| 7,828,553 B2 | * | 11/2010 | Baerg | 434/203 |
| 7,997,902 B2 | * | 8/2011 | Hayes | 434/188 |

* cited by examiner

*Primary Examiner* — Kurt Fernstrom
*Assistant Examiner* — Dolores Collins
(74) *Attorney, Agent, or Firm* — Murabito Hao & Barnes LLP; Andrew D. Fortney

(57) ABSTRACT

Methods for forming and using an educational kit are disclosed. The kit may be useful as an educational tool or toy for the exploration of mathematical concepts such as multiplication, exponents, and logarithms. Such a kit may include a set of at least three masses, each mass having a numerical label, wherein a first mass has a first numerical label and a first weight, a second mass has a second numerical label and a second weight, a third mass has a third numerical label and a third weight, a sum of the first weight and the second weight equals the third weight, and the first numerical label multiplied by the second numerical label equals the third numerical label.

20 Claims, 5 Drawing Sheets

US 8,591,234 B1

KITS AND METHODS FOR EXPLORING MATHEMATICAL CONCEPTS

FIELD OF THE INVENTION

The present invention generally relates to the field of educational tools. More specifically, embodiments of the present invention pertain to educational tools for exploring mathematical concepts.

DISCUSSION OF THE BACKGROUND

FIG. 1A shows a conventional educational tool.

Referring to FIG. 1A, a set of blocks 101 are shown, each containing a numerical label (102a, 102b, 102c, 102d, 102e and 102f, respectively). The weight of each block directly corresponds to the value of the numerical label found on the block. For example, a block which has a numerical label of "6" may have a weight of 6 grams (or 6 ounces). Similarly, a block which has a numerical label of "12" may have a weight of 12 grams (or 12 ounces).

Thus, a block whose numerical label is twice that of another block's numerical label will weigh twice as much as that block. For example, a block whose numerical label is "10" will weigh twice as much as a block whose numerical label is "5". Furthermore, blocks whose numerical labels add up to a sum will balance on an ordinary scale 103 (e.g., a conventional two-pan balance) when placed opposite to a block whose numerical label equals that sum. Thus, referring to FIG. 1B, blocks "2" (101a) and "3" (101b) will balance on an ordinary scale 103 when placed opposite to block "5" (101c). Such blocks are beneficial in that they provide a concrete example of the concept of addition to students by using a "hands on" approach.

However, such blocks are limited in that they only allow students or individuals to practice addition.

SUMMARY OF THE INVENTION

The present invention is directed to an educational kit (or tool or device) that meets a need in the art to facilitate learning of mathematical concepts other than addition.

Embodiments of the present invention relate to an educational kit, methods for making the kit, and a method of using the kit, for example, to determine a product of two or more integers. The kit generally comprises a set of at least three masses, each mass having a numerical label, wherein a first mass has a first numerical label and a first weight; a second mass has a second numerical label different from the first numerical label and a second weight different from the first weight; and a third mass has a third numerical label and a third weight, such that a sum of the first weight and the second weight equals the third weight, and the first numerical label multiplied by the second numerical label equals the third numerical label.

The method of manufacturing an educational kit generally comprises the steps of forming a set of at least three containers, each having a unique numerical label, such that a first numerical label on a first container multiplied by a second numerical label on a second container equals a third numerical label on a third container; and placing a first mass having a first weight in the first container, a second mass having a second weight in the second container, and a third mass having a third weight in the third container, such that a sum of the first weight and the second weight equals the third weight.

The method of using the kit to determine a product of two or more integers generally comprises the steps of placing first and second masses having respective first and second weights and first and second numerical labels thereon on a first side of a weight/mass measuring and/or balancing device; placing a third mass having a third weight and third numerical label thereon on a second side of the weight/mass measuring and/or balancing device; and inspecting the weight/mass measuring and/or balancing device to determine whether a combined weight of the first and second masses is equal or substantially equal to the third weight, wherein each of the numerical labels consists of an integer of 2 or greater, and the first, second and third weights each correspond to a logarithmic function performed on the first, second and third numerical labels, respectively.

The present invention advantageously provides an educational kit (or tool) capable of allowing students to confirm their knowledge of "times tables" (e.g., multiplication and division). The present invention advantageously provides an educational kit (or tool) for heightening student interest in the subject of math (mathematics), specifically the topic(s) of multiplication, division, exponents and/or logarithms. The present invention advantageously provides a challenge or inquiry lesson to math and/or science students by encouraging students to discover how the weights of the masses (e.g., blocks) were determined (or chosen). The present invention advantageously provides an entertaining educational tool and/or toy for children or adults of any age, including students.

These and other advantages of the present invention will become readily apparent from the detailed description of preferred embodiments below.

DETAILED DESCRIPTION

Figure 1A:
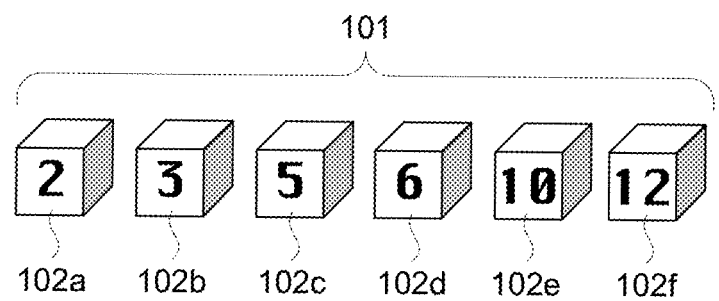
FIG. 1A is a diagram showing a set of blocks for a conventional educational device.
Figure 1B:
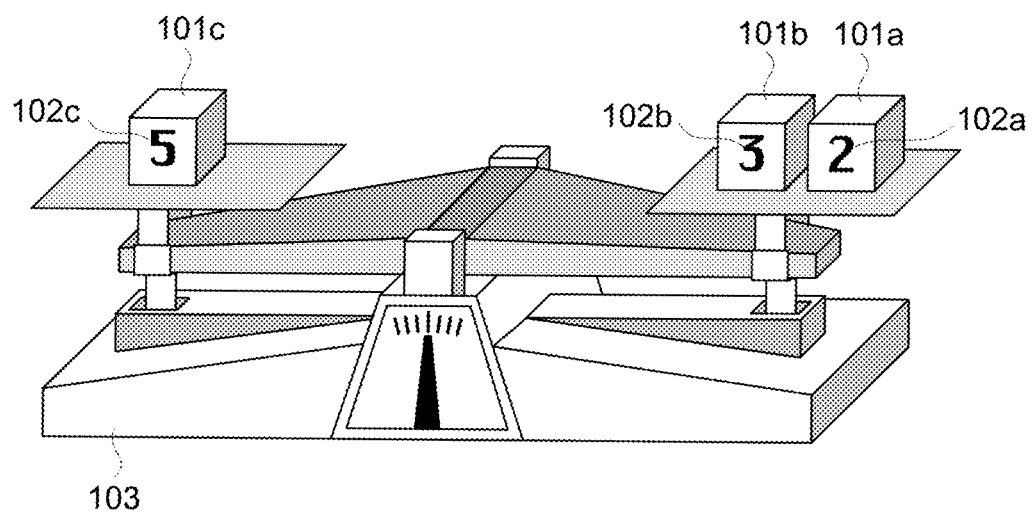
FIG. 1B is a diagram showing an aspect of the conventional educational device.

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

The present invention concerns an educational kit, generally comprising a set of at least three masses, each mass having a numerical label, wherein a first mass has a first numerical label and a first weight; a second mass has a second numerical label different from the first numerical label and a second weight different from the first weight; and a third mass has a third numerical label and a third weight, such that a sum of the first weight and the second weight equals the third weight, and the first numerical label multiplied by the second numerical label equals the third numerical label.

A further aspect of the invention concerns a method of manufacturing an educational kit, generally comprising the steps of forming a set of at least three containers, each having a unique numerical label, such that a first numerical label on a first container multiplied by a second numerical label on a second container equals a third numerical label on a third container; and placing a first mass having a first weight in the first container, a second mass having a second weight in the second container, and a third mass having a third weight in the third container, such that a sum of the first weight and the second weight equals the third weight.

Even further aspects of the invention concern a method of determining a product of two or more integers, generally comprising placing first and second masses having respective first and second weights and first and second numerical labels thereon on a first side of a weight/mass measuring and/or balancing device; placing a third mass having a third weight and third numerical label thereon on a second side of the weight/mass measuring and/or balancing device; and inspecting the weight/mass measuring and/or balancing device to determine whether a combined weight of the first and second masses is equal or substantially equal to the third weight, wherein each of the numerical labels consists of an integer of 2 or greater, and the first, second and third weights each correspond to a logarithmic function performed on the first, second and third numerical labels, respectively.

The invention, in its various aspects, will be explained in greater detail below with regard to exemplary embodiments.

An Exemplary Educational Kit

Figure 2A:
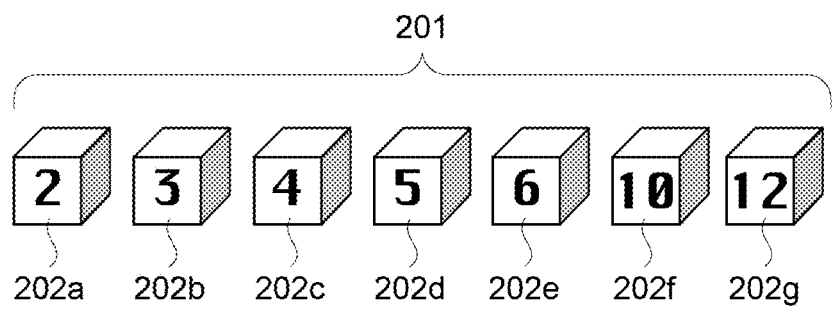
FIG. 2A is a diagram showing an exemplary set of masses for an educational kit (or tool) according to the present invention.

FIG. 2A shows a first exemplary set of masses for an embodiment of the present educational kit.

Referring to FIG. 2A, an educational tool according to the present invention may include a plurality of masses 201, which may be or comprise containers in the shape of cubes or blocks. Other shapes such as pyramidal, semi-spherical, cylindrical, amorphous, etc. are also contemplated. Each mass may contain a numerical label (e.g., 202a, 202b, 202c, 202d, 202e, 202f and 202g, respectively). Each numerical label is a number, which may be an integer of 2 or greater. Each mass may independently have a first one of a variety of colors, and each numerical label may independently have a second one of a variety of colors. Each numerical label, for example, may be affixed to or engraved upon (or drawn or painted on) its respective mass. Where the masses or containers comprise a formable/moldable material, such as plastic, or an easily modified or removed material, such as wood, the numerical label may be formed as an integral part of the mass or container (e.g., by forming the number in the molding, removing a surface layer around the number to form a raised number on the container, etc.).

The weight of each mass may be the combined weight of a container, the contents of the container, and any glue or adhesive that may have been used to assemble the mass. The weight of each mass may correspond to a logarithmic value of (i.e., a logarithmic function performed upon) the numerical label found on the mass. A "base 10" log may be used, or other bases such as base 5, base e (2.718 . . . ), etc. may be used. For example, a mass which has a numerical label of "6" may have a weight of (approximately) 0.7782 pounds, since 0.7782 is the (base 10) logarithm of 6. Similarly, a mass which has a numerical label of "12" may have a weight of (approximately) 1.0792 pounds, since 1.0792 is the (base 10) logarithm of 12.

Of course, a multiplier (or divider) may be used for all masses (i.e., "across the board") to achieve a minimum (or maximum) mass weight, or simply for convenience. For example, if heavier weights are desired, the weights mentioned above (for masses "6" and "12") may each be multiplied by 2, resulting in weights of (0.7782×2) 1.5564 pounds and (1.0792×2) 2.1584 pounds, respectively.

Also, the logarithmic function performed upon the numerical label does not have to be "base 10" but could be the "natural" logarithm or a different base (e.g., base 5, base 8.3, etc.). The numerical labels can also be chosen to correspond to a different base number system, for example, binary (base 2), senary (base 6) or hexadecimal (base 16).

Figure 2B:
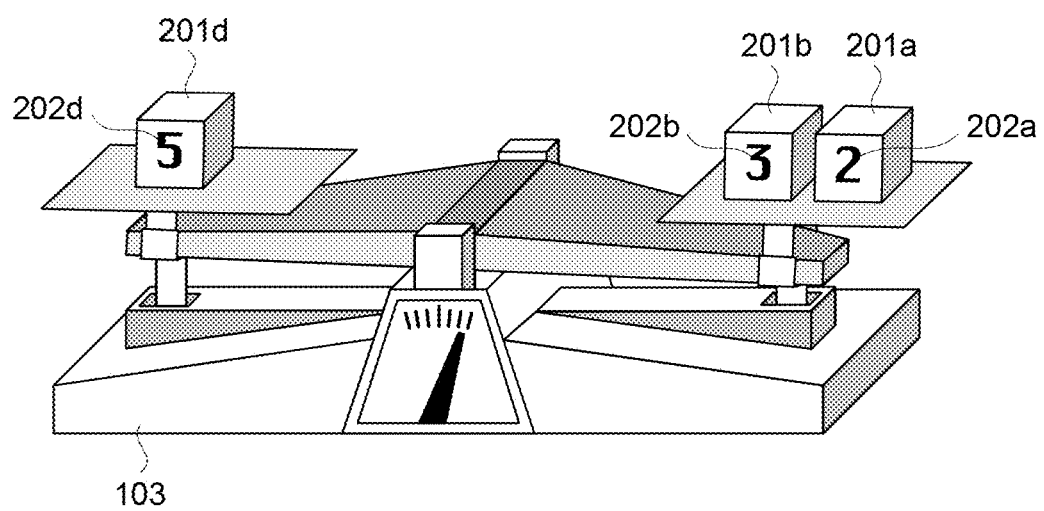
FIG. 2B is a diagram showing a use of the exemplary educational kit (or tool) according to aspects of the present invention.

Thus, a mass whose numerical label is twice that of another mass' numerical label will, in nearly all cases, not weigh twice as much. Furthermore, masses whose numerical labels add up to a sum will, in nearly all cases, not balance on an ordinary scale 103 when placed opposite to a mass whose numerical label equals that sum. For example, according to the present invention, the weight of a mass labeled "2" may be 0.301 pounds, the weight of a mass labeled "3" may be 0.477 pounds, and the weight of a mass labeled "5" may be 0.699 pounds. Thus, referring to the example of FIG. 2B, masses "2" and "3" (combined weight 0.778 pounds) will not balance on an ordinary scale 103 when placed opposite to mass "5" (0.699 pounds).

Figure 2C:
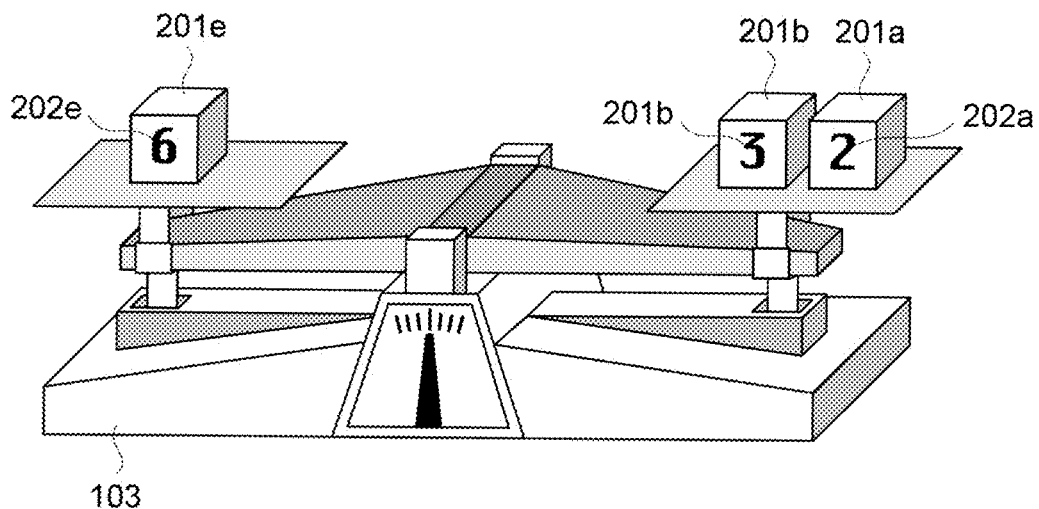
FIG. 2C is a diagram showing another use of the exemplary educational kit (or tool) in accordance with additional aspects of the present invention.

However, masses whose numerical labels multiply to a product (e.g., "A"×"B"=C) will balance on an ordinary scale 103 when placed opposite to a mass whose numerical label equals that product (e.g., a mass whose numerical label is "C"). According to the present invention, the weight of a mass labeled "6" may be 0.778 pounds. Thus, referring to FIG. 2C, masses "2" and "3" (combined weight 0.778 pounds) will balance on an ordinary scale 103 when placed opposite to mass "6" (0.778 pounds=0.778 pounds).

Figure 2D:
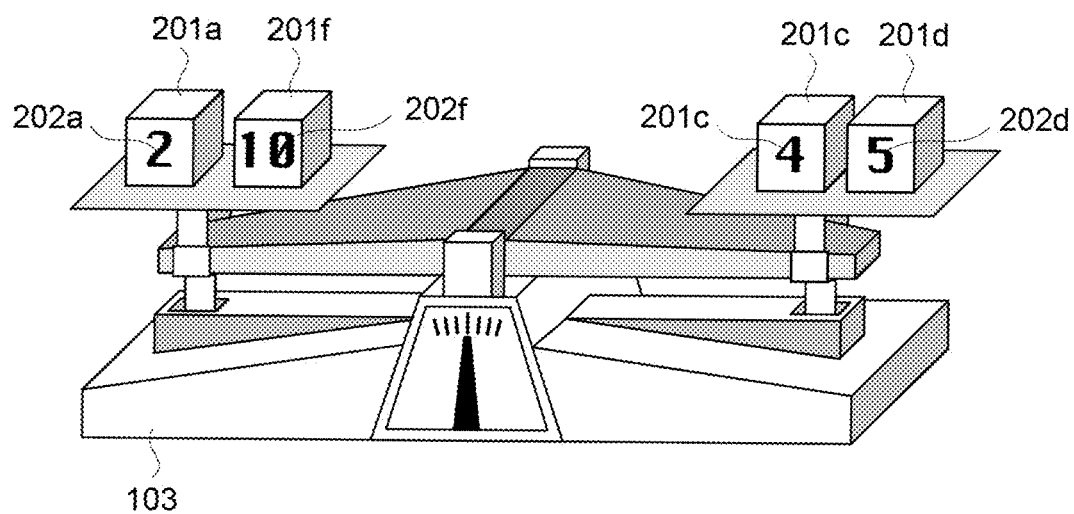
FIG. 2D is a diagram showing a third use of the exemplary educational kit (or tool) in accordance with further aspects of the present invention.

Furthermore, masses whose numerical labels multiply to a product (e.g., "A"×"B"=C) will balance on an ordinary scale 103 when placed opposite to other masses whose numerical labels also multiply to that product (e.g., masses labeled "Y" and "Z", which multiplied together also equals C). According to the present invention, the weight of a mass labeled "4" may be 0.602 pounds, and the weight of a mass labeled "10" may be 1.000 ounce. Thus, referring to FIG. 2D, masses "4" and "5" (combined weight=0.602 lbs.+0.699 lbs.=1.301 lbs.) will balance on an ordinary scale 103 when placed opposite to masses "2" and "10" (combined weight=0.301 lbs.+1.000 lbs.=1.301 lbs.).

Figure 2E:
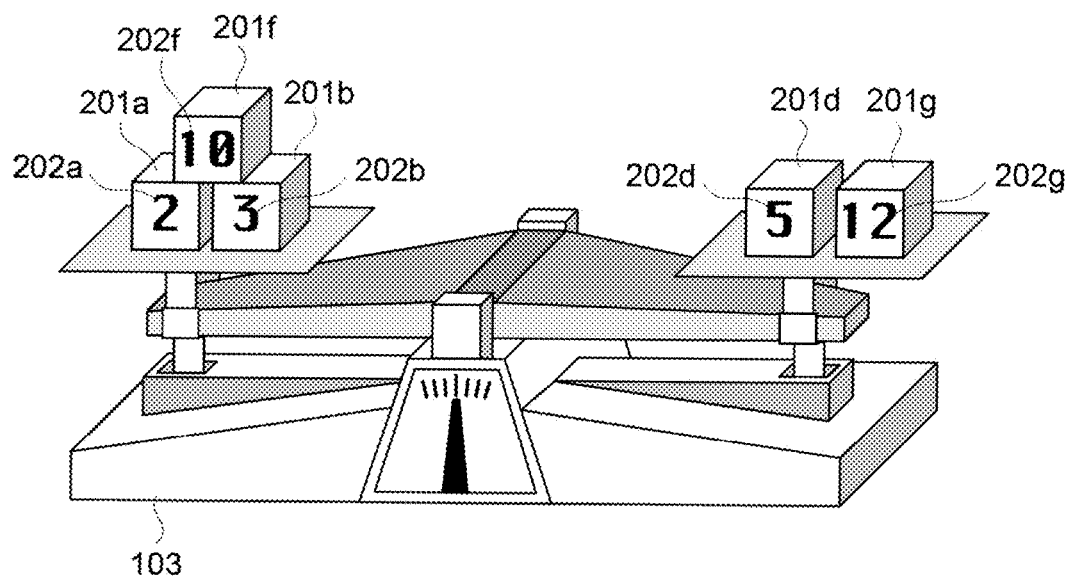
FIG. 2E is diagram showing a fourth use of the exemplary educational kit (or tool) in accordance with yet further aspects of the present invention.

As a further illustration, more than two masses whose numerical labels multiply to a product (e.g., "A"×"B"× "C"=D) will balance on an ordinary scale 103 when placed opposite to other masses whose numerical labels multiply to that product (e.g., "F"×"G"=D). According to the present invention, the weight of a mass labeled "12" may be 1.079 pounds. Thus, referring to FIG. 2E, masses "2", "3" and "10" (combined weight=0.301 lbs.+0.477 lbs.+1.000 lbs.=1.778 lbs.) will balance on an ordinary scale 103 when placed opposite to masses "5" and "12" (combined weight=0.699 lbs.+1.079 lbs.=1.778 lbs.).

The present invention may comprise simply the masses 201 by themselves, or may also comprise (i) a box or other container in which the masses are stored and/or transported and/or (ii) a device capable of measuring and/or balancing weight and/or mass (e.g., scale 103), configured to determine whether a combined weight of a first subset of masses is equal or substantially equal to a combined weight of a second subset of masses. The weight/mass measuring and/or balancing device should ideally be able to weigh a subset of at least four masses against a subset of at least four other masses, but is adequate if it is able to weigh one mass against a subset of two other masses.

It may be desirable to use a scale which has some degree of insensitivity, e.g., a scale which will indicate that two weights are equal to each other even though such weights are only approximately equal to each other. For example, small variations in the weight of the masses may occur due to random variations in the manufacturing process of the masses. Alternatively, over time, variations in the weights of the masses may occur, e.g., due to wear and tear on the containers or the accumulation of dirt or other foreign matter thereon. Therefore, a balancing device that indicates a balanced result, even though there may be a difference of up to a few tenths of a percent between the weights on either side, can be beneficial. Additionally, the absence of a need for highly accurate weight values can reduce manufacturing costs associated with relatively precise balancing equipment and/or masses having relatively accurate weights.

However, such variation in the weight of the masses and/or the insensitivity of the balancing device is not unlimited. For example, a scale should not indicate that a mass labeled "3" and a mass labeled "5" on one side of a scale (i.e., a product of 15) balances with a mass labeled "2" and a mass labeled "8" on the other side of the scale (i.e., a product of 16). Likewise, the balancing device and/or weights of the masses should be accurate enough to clearly indicate a difference between masses with numerical labels of two consecutive integers (e.g., "5" and "6," or "9" and "10") and between combinations of masses whose respective products equal consecutive integers (e.g., "15" and "16") or closest possible integers (e.g., "48" [6×8] and "50" [5×10] in the set of masses listed in Table 1 below). Thus, the balancing device for use in the present kit should have an accuracy or sensitivity of less than the difference in weights (which can be expressed as a percentage, or more preferably, as an absolute mass difference) between the two highest consecutive integer products possible with the set of masses in the kit.

The present invention may also comprise an instruction manual on how to use and/or make the kit. The instruction manual may be provided in one or more forms of media (e.g., booklet, pamphlet, CD, CD-ROM, DVD, DVD-ROM, audio recording, computer program, etc.). The instruction manual may include instructions for teachers or parents on how to make and/or use the kit in a lesson (or sequence of lessons) for students of various mathematical skill levels ranging from elementary school to college or university. The instruction manual may also contain step-by-step instructions to students on how to use the kit to explore mathematical concepts.

The computer program, software, and/or other media may be implementable and/or executable in a general purpose computer or workstation equipped with a conventional digital signal processor, configured to execute such program or software or play back such media. For example, the computer program and/or software may be on any kind of readable medium, and the computer-readable medium may comprise any medium that can be read by a processing device configured to read the medium and execute code stored thereon or therein, such as a floppy disk, CD-ROM, magnetic tape or hard disk drive. Such code may comprise object code, source code and/or binary code. The waveform and/or code for implementing the present program and/or software are generally digital, and are generally configured for processing by a conventional digital data processor (e.g., a microprocessor, microcontroller, or logic circuit such as a programmable gate array, programmable logic circuit/device or application-specific [integrated] circuit).

The media are generally configured for playback on an appropriate media player, such as a DVD player, Blue-Ray disc player, VCR, CD-ROM, etc., in communication with an appropriate viewer or other play-back apparatus (e.g., television, video projector, monitor, audio system, etc.).

Exemplary Masses

Figure 3:
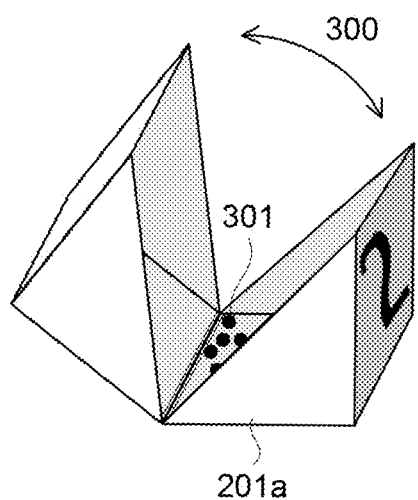
FIG. 3 is a diagram showing an exemplary mass according to the present invention.

Referring to FIG. 3, each mass may be a container (or may comprise a container) capable of being partially filled and/or partially emptied to achieve a desired weight. For example, the plurality of masses 201 may be formed of identical blocks (i.e., identical in size, shape, and/or appearance except for their respective numerical labels), each block having a hollow chamber 300 within.

The chamber 300 may be (partially or completely) filled by small masses 301 (e.g., BB pellets, ball bearings, sand, etc.) in order to achieve the desired weight (e.g., a weight based upon the logarithm of the block's numerical label multiplied by a constant). Small masses 301 are preferably not items whose mass changes with time (e.g., a material containing a volatile liquid therein, or that may be hygroscopic). The chamber 300 may be designed to be easily opened and closed in order to inspect and/or adjust the number of small masses 301 inside. The chamber 300 can also be transparent or translucent in order to allow a visual inspection of the number of small masses 301 without opening the chamber 300.

Of course, the masses do not have to be in cube or block form, and other shapes such as pyramidal, semi-spherical, cylindrical, amorphous, etc. are contemplated. In fact, the shape of the mass may be the numerical label itself (e.g., a mass with a numerical label of "5" may be in the shape of the Arabic numeral 5). In other words, in this example, the numerical label can be the shape, and the shape can match the numerical label.

The masses may be identical in size, shape, and/or appearance except for their respective numerical labels. It should also be noted that there may be more than one mass with the same numerical label (e.g., two or more masses with the numerical label "2").

It is also contemplated that the present invention may function best when the user of the device is provided with a large number of masses with many different numerical labels. Therefore, in one example, a set of masses comprises fourteen blocks with the numerical labels "2", "2", "3", "4", "5", "6", "8", "10", "12", "15", "16", "20", "30" and "60", respectively. In this example, the weights of the fourteen blocks can be determined by using the following table:

TABLE 1

Exemplary Masses.

| Numerical Label | Log (base 10) | Multiplier | Total Weight of Container plus Mass Therein |
|---|---|---|---|
| 2 | 0.30103 | ×1 | 0.301 lbs |
| 2 | 0.30103 | ×1 | 0.301 lbs |
| 3 | 0.47712 | ×1 | 0.477 lbs |
| 4 | 0.60205 | ×1 | 0.602 lbs |
| 5 | 0.69897 | ×1 | 0.699 lbs |
| 6 | 0.77815 | ×1 | 0.778 lbs |
| 8 | 0.90308 | ×1 | 0.903 lbs |
| 10 | 1.00000 | ×1 | 1.000 lbs |
| 12 | 1.07918 | ×1 | 1.079 lbs |
| 15 | 1.17609 | ×1 | 1.176 lbs |
| 16 | 1.20412 | ×1 | 1.204 lbs |
| 20 | 1.30103 | ×1 | 1.301 lbs |
| 30 | 1.47713 | ×1 | 1.477 lbs |
| 60 | 1.77815 | ×1 | 1.778 lbs |

Figure 4:
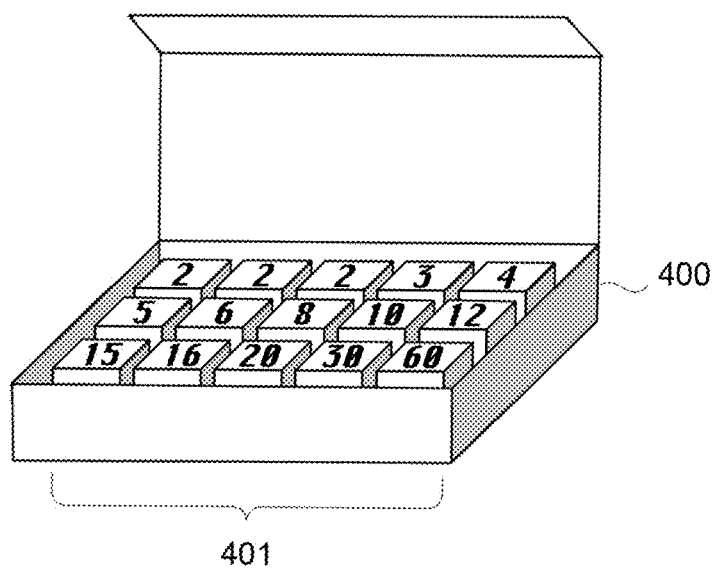
FIG. 4 is a diagram showing another exemplary educational kit according to the present invention.

It is within the abilities of one skilled in the art to choose other numbers of blocks, values of the numerical labels, and corresponding weights of the masses to make other kits. The kits may include blocks or masses with labels including any or all integers of 2 or greater. Referring to FIG. 4, a kit may include a set of masses 401 which comprise the above described fourteen blocks and an additional "2" block, for a total of fifteen blocks. The kit may include a box 400 in which one or more of the fifteen blocks may be stored and/or transported.

Masses whose numerical labels have a large number of factors (e.g., integers that are multiples of at least 3 or 4 different, smaller integers greater than 1) may be particularly desirable for the kit, whereas masses whose numerical labels have very few such factors (e.g., prime numbers of 7 or greater) may be less desirable. For example, a block labeled "12" may be preferred over a block labeled "14" because the number 12 is divisible by the integers 2, 3, 4, and 6 whereas the number 14 is only divisible by the integers 2 and 7. Therefore, given the choice between including either a mass labeled "12" or a mass labeled "14" in the kit, the mass labeled "12" may be preferred. Likewise, if masses labeled "12" and "14" are already chosen for the kit, then given the choice between including an additional mass labeled "12" or an additional mass labeled "14" in the kit, the additional mass labeled "12" may be preferred.

It is contemplated that other units for weight besides pounds (lbs.) may be chosen or used, including ounces or grams (even though it is understood that grams are not technically a measure of weight). And, of course, a different multiplier may be chosen or used for determining the weights (e.g., 2, 3, 1.5, ⅓, etc.).

It is to be understood that when an equation (or numerical relationship) in the present application states that two values are equal to each other, the two values may be exactly equal to each other or may be substantially equal to each other. For example, it is generally advantageous from the perspective of manufacturing costs to allow some variation in the weight of the masses (although such variation is not unlimited). However, there may be a practical limit as to the variability in the weights of the masses.

For example, the absolute difference between 2 and 3 is exactly the same as the absolute difference between 51 and 52 (e.g., 4×13). However, the difference between $\log_{10} 2$ and $\log_{10} 3$ is more than twenty times larger than the difference between $\log_{10} 51$ and $\log_{10} 52$. This observation may place a practical constraint on the variability of the weights of the masses and/or the accuracy of the balancing device. A moderately accurate balance can easily show that the weight of a mass labeled "2" (e.g., 120.4 grams when using a multiplier of 400; see Table 1) is different from the weight of a mass labeled "3" (e.g., 190.8 grams when using the same weight unit [in this case, grams] and multiplier). However, a balance that can determine the difference between the weight of masses having labels with a product of "51" (3×17; e.g., 683.0 grams when using the same weight unit and multiplier as the "2"/"3" example in this paragraph) and with a product of "52" (4×13; e.g., 686.4 grams using the same weight unit and multiplier) must be more accurate. Thus, if one wishes to include masses labeled with integers having products of 51 and 52, the random variations in weights of the masses should be sufficiently smaller than the difference in target (e.g., theoretical) weights divided by the number of masses to be placed on the balancing device to clearly show a difference in the result of the multiplication operation. This can therefore limit the values of the labels to be included in the set of masses.

In order to satisfy both manufacturing constraints and performance demands, the deviation in weight of each mass from its theoretical or target weight may be less than a predetermined value (e.g., 1 ounce, 1 gram, or a fraction thereof, such as ¼ ounce or 0.1 gram). This predetermined maximum deviation in weight of each mass will vary, depending on the weight unit, the multiplier, and the materials used for the container (e.g., 201a in FIG. 3), the adhesive, and/or the small masses filling the container (e.g., 301 in FIG. 3). This can avoid the confusion that may result when the weight of the masses on one side of the balance is close to the weight of the masses on the other side.

As an illustration, suppose one wishes to see if 6×8 is equal to 5×10. The two products (48 and 50) are close. How sensitive must the balance be to detect this difference? For this example, we will assume that the multiplier to get actual/target weights of the masses in grams is 91.8. The target weight of the mass labeled "6" is thus $\log_{10} 6 \times 91.8$ grams=71.43 grams. The weights of the masses involved in this test are:

6×8: 71.43 g+82.90 g=154.33 g

5×10: 64.17 g+91.80 g=155.97 g

The difference between 154.33 g and 155.97 g is about 1.6 g. In order to demonstrate that 6×8 is not equal to 5×10, the balance must be sensitive enough that the pan holding the masses labeled "5" and "10" drops clearly below the pan holding the masses labeled "6" and "8".

On the other hand, the balance should not be too sensitive. There may be some unavoidable variation in weights of the masses. In order for correct equations to be seen as equal, the deviation of each mass from its theoretical/target weight must be significantly smaller than the smallest possible difference in the target weights of masses having different labels, as well as the target weights of first and second groups or subsets of masses in the set whose labels have different products (in the above example, 1.6 grams). For this example, a deviation of about 0.1 grams from the theoretical weight may be the allowable maximum (1.6>>4×0.1), so as to avoid confusion on the part of the person operating the device. A maximum weight deviation of 0.1 grams translates to a worst-case sensitivity of about 0.4 grams for the balance (assuming the balance will generally not be used for more than 4 masses at a time). As a result, a difference of less than 0.4 grams on such a balance will show that the numbers and/or products of numbers on either side of the balance are equal.

CONCLUSION/SUMMARY

Thus, the present invention provides an educational kit, methods for making the kit, and a method of determining a product of two or more integers.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. An educational kit, comprising a set of at least three masses, each mass consisting of a closed container or an individual block having a numerical label consisting of a positive integer of 2 or more, wherein a first mass has a first numerical label and a first weight, a second mass has a second numerical label different from the first numerical label and a second weight different from the first weight, and a third mass has a third numerical label and a third weight, such that a sum of the first weight and the second weight equals the third weight, and the first numerical label multiplied by the second numerical label equals the third numerical label.

2. The kit of claim 1, further comprising a fourth mass having a fourth numerical label and a fourth weight, the fourth mass consisting of another closed container or individual block having a numerical label consisting of a positive integer of 2 or more, wherein a sum of at least two of the weights of the first through third masses equals the weight of the fourth mass, and a product of the numerical labels of said at least 2 weights is equal to the fourth numerical label.

3. The kit of claim 1, wherein all of the masses are identical or substantially identical in size and shape except for their respective numerical labels.

4. The kit of claim 3, wherein all of the masses are further identical or substantially identical in appearance except for their respective numerical labels.

5. The kit of claim 1, further comprising a weight/mass measuring and/or balancing device configured to determine whether a combined weight of a first subset of masses is equal or substantially equal to a combined weight of a second subset of masses.

6. The kit of claim 1, wherein each mass comprises said container, said container being partially filled with a substance having a weight that does not vary with time.

7. The kit of claim 1, wherein the first weight corresponds to a logarithmic function performed on the first numerical label, the second weight corresponds to the logarithmic function performed on the second numerical label, and the third weight corresponds to the logarithmic function performed on the third numerical label.

8. The kit of claim 1, wherein the set of at least three masses comprises at least five masses whose numerical labels are 2, 3, 4, 6 and 8, respectively, wherein a combined weight of the masses labeled "2" and "3" is equal or substantially equal to a weight of the mass labeled "6", and a combined weight of the masses labeled "2" and "4" is equal or substantially equal to a weight of the mass labeled "8".

9. A method for manufacturing an educational kit, comprising the steps of:
  forming a set of at least three containers, at least three of which have numerical labels different from each other, each of the numerical labels consisting of a positive integer of 2 or more, such that a first numerical label on a first container multiplied by a second numerical label on a second container equals a third numerical label on a third container;
  placing a first mass having a first weight in the first container, a second mass having a second weight in the second container, and a third mass having a third weight in the third container, such that a sum of the first weight and the second weight is equal or substantially equal to the third weight; and
  closing the at least three containers.

10. The method of claim 9, wherein forming the set of at least three containers comprises forming a fourth container having a fourth numerical label consisting of a positive integer of 2 or more and a fifth container having a fifth numerical label consisting of a positive integer of 2 or more, such that the first numerical label multiplied by the fourth numerical label equals the fifth numerical label, and further comprising placing a fourth mass having a fourth weight in the fourth container and a fifth mass having a fifth weight in the fifth container, such that a sum of the first weight and the fourth weight is equal or substantially equal to the fifth weight, and closing the fourth and fifth containers.

11. The method of claim 9, wherein all of the containers are identical or substantially identical in size and shape except for their respective numerical labels.

12. The method of claim 11, wherein all of the containers are further identical or substantially identical in appearance except for their respective numerical labels.

13. The method of claim 9, further comprising forming a weight/mass measuring and/or balancing kit configured to determine whether a combined weight of a first subset of masses is equal or substantially equal to a combined weight of a second subset of masses.

14. The method of claim 9, wherein each container is partially filled with a substance having a weight that does not vary with time.

15. The method of claim 9, further comprising:
  performing a logarithmic function on each of the first, second and third numerical labels; and
  choosing the weights of each of the first, second and third masses based on first, second and third results, respectively, of performing the logarithmic function.

16. The method of claim 9, wherein forming the set of at least three containers comprises forming at least first, second, third, fourth and fifth containers whose numerical labels are 2, 3, 6, 4 and 8, respectively, and further comprising placing a fourth mass having a fourth weight in the fourth container and a fifth mass having a fifth weight in the fifth container, such that a sum of the first weight and the fourth weight is equal or substantially equal to the fifth weight.

17. A method of determining a product of two or more integers, comprising the steps of:
  placing first and second masses on a first side of a weight/mass measuring and/or balancing device, each of the first and second masses consisting of a closed container or an individual block having respective first and second weights and first and second numerical labels thereon;
  placing a third mass having a third weight and third numerical label thereon on a second side of the weight/ mass measuring and/or balancing device, the third mass consisting of another closed container or individual block; and inspecting the weight/mass measuring and/or balancing device to determine whether a combined weight of the first and second masses is equal or substantially equal to the third weight, wherein each of the numerical labels consists of an integer of 2 or greater, and the first, second and third weights each correspond to a logarithmic function performed on the first, second and third numerical labels, respectively.

18. The method of claim 17, wherein each mass comprises said container, said container being partially filled with a substance having a weight that does not vary with time.

19. The method of claim 17, wherein all of the masses are identical or substantially identical in size and shape except for their respective numerical labels.

20. The method of claim 19, wherein all of the masses are further identical or substantially identical in appearance except for their respective numerical labels.

* * * * *